United States Patent [19]

Hellermann et al.

[11] Patent Number: 4,894,425
[45] Date of Patent: Jan. 16, 1990

[54] PREPARATION OF POLYISOPRENE HAVING HIGH CONTENT OF 1,2- AND 3,4-STRUCTURAL UNITS BY ANIONIC POLYMERIZATION

[75] Inventors: Walter Hellermann, Dorsten; Karl-Heinz Nordsiek, Marl; Jürgen Wolpers, Haltern, all of Fed. Rep. of Germany

[73] Assignee: Huels Aktiengesellschaft, Marl, Fed. Rep. of Germany

[21] Appl. No.: 55,543

[22] Filed: May 29, 1987

[30] Foreign Application Priority Data

May 31, 1986 [DE] Fed. Rep. of Germany ....... 3618351
Jun. 27, 1986 [DE] Fed. Rep. of Germany ....... 3621628
Dec. 18, 1986 [DE] Fed. Rep. of Germany ....... 3643250
Mar. 7, 1987 [DE] Fed. Rep. of Germany ....... 3707434

[51] Int. Cl.$^4$ ................................. C08F 4/48
[52] U.S. Cl. ................................. 526/181; 526/173; 526/209; 526/340.2; 525/244; 525/250; 525/333.1; 525/342; 525/371; 525/914
[58] Field of Search ............ 526/173, 209, 340.2, 526/181; 525/250, 258, 333.1, 914, 244, 342, 371

[56] References Cited

U.S. PATENT DOCUMENTS 4,118,258 10/1978 Graveron et al. .................... 156/60
4,385,151 5/1983 Furukawa et al. ......... 526/340.2 X
4,577,002 3/1986 Broekhuis ........................... 526/181

FOREIGN PATENT DOCUMENTS 0836189 6/1960 United Kingdom ................ 526/181

OTHER PUBLICATIONS

Hirokazu Morita et al., "Isoprene Polymerization by Organometallic Compounds, I," JACS 79, 5853 (1957).

Primary Examiner—Joseph L. Schofer
Assistant Examiner—F. M. Teskin
Attorney, Agent, or Firm—Millen, White & Zelano

[57] ABSTRACT

Polyisoprenes having a high content of 1,2- and 3,4-structural units, a process for their preparation, and their use.

The previous processes for the preparation of polyisoprene having a high content of 1,2- and 3,4-structural units were still unsatisfactory in terms of the cocatalyst employed.

The use of ethylene glycol dialkyl ethers of the formula

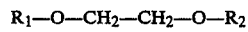

$$R_1-O-CH_2-CH_2-O-R_2$$

in which $R_1$ and $R_2$ are alkyl groups having different numbers of C atoms, from the group consisting of methyl, ethyl, n- and isopropyl and n-, iso-, sec.- and tert.-butyl, has, in particular, the advantage that the "living polymers" formed during the anionic polymerization are not damaged.

The production of tires and damping elements using these polyisoprenes.

11 Claims, No Drawings

PREPARATION OF POLYISOPRENE HAVING HIGH CONTENT OF 1,2- AND 3,4-STRUCTURAL UNITS BY ANIONIC POLYMERIZATION

The invention relates to polyisoprenes which contain more than 70% of 1,2- and 3,4-structural units, a process for their preparation, and their use for the production of tires and of damping elements. The following chain segments of the polymerization may be regarded as 1,2- and 3,4-structural units:

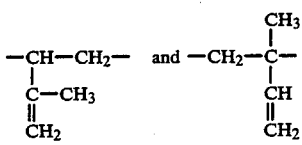

A large number of processes for the preparation of polyisoprene are known from the prior art. Processes which have become industrially important are, in particular, those in which isoprene is subjected to anionic polymerization in an inert organic solvent, such as, for example, hexane, cyclohexane or toluene. Organo-alkali metal compounds, in particular alkyllithium compounds, are used as the initiator, which is usually referred to as a catalyst.

Rubbers having a stellate structure have advantages over their homologs with a linear structure (cf. European Offenlegungsschrift No. 0,090,365). They are obtained by converting the diene monomers to so-called "living polymers" and then converting these with coupling agents, such as, for example, polyhalogen compounds or divinylaromatics. Under the conditions described above, a polyisoprene is obtained which predominantly consists of 1,4-structural units of the formula

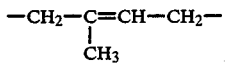

It is known that the presence of certain polar compounds, which are also referred to as cocatalysts, influences the microstructure and hence the course of the polymerization in such a way that 1,2- and 3,4-structural units are preferentially formed (cf. K. H. Nordsiek and K. M. Kiepert, Kautschuk und Gummi, Kunststoffe 35, 371 (1982) and K. H. Nordsiek, Kautschuk und Gummi, Kunststoffe 39, 599 (1986)).

In the past, a number of processes for the preparation of polymers based on isoprene have been developed, in which various cocatalysts were used. It has been found that the cocatalyst influences the polymerization in a variety of ways. Specifically, the cocatalyst has to meet the following requirements:

1. It should not lead to any annoying odors. This means that, for example, tertiary amines, which have also been proposed as cocatalysts, are unsuitable for this reason. Moreover, amines have an adverse effect on the adhesion of steel in the tire.
2. It should control the course of the polymerization in such a way that the polymer obtained contains more than 70% of 1,2- and 3,4-structural units.
3. In principle, the action of a cocatalyst is dependent on the ratio of the molar amounts of cocatalyst and catalyst, i.e. the organolithium compound. The effect to be achieved according to 2) should be obtainable with a cocatalyst/catalyst molar ratio as low as 5:1.
4. The addition of cocatalyst affects the yield of polyisoprene. Cocatalysts with which yields of 90% cannot be obtained are unsuitable.
5. The cocatalyst should be substantially inert to the "living polymers" present as an anion during the polymerization. This requirement is particularly important when, after the polymerization was complete, the living polymers are converted with coupling agents to stellate rubbers or are reacted with suitable electrophilic compounds.
6. The cocatalyst should be capable of being readily separated off by distillation from the solvent used.
7. The cocatalyst should permit high polymerization rates.
8. The cocatalyst should be easy to synthesize.

On the basis of these requirements, in principle only the compounds containing ether groups are suitable as cocatalysts.

Aliphatic dialkyl ethers, such as, for example, diethyl ether, and cyclic ethers, such as tetrahydrofuran (THF), do not exhibit adequate microstructure regulation (cf. T. A. Antkowiak et al., J. of Polymer Science, part A-1, vol. 10, pages 1319 to 1334 (1972)).

Thus, for example, in the anionic polymerization of butadiene with butyllithium in the presence of even a 85-fold excess of THF, a polybutadiene is obtained which contains only 49% of 1,2-structural units. The use of such a large amount of cocatalyst is regarded as a great disadvantage in practice.

The same publication states that, using ethylene glycol dimethyl ether as a cocatalyst in the polymerization of butadiene, a polymer containing 63.7% of 1,2-structural units can be obtained. However, this glycol ether has two substantial disadvantages. Firstly, it cannot readily be separated off from hexane. Secondly, the coupling yield of this ethylene glycol dialkyl ether is 0%. Hence, it had to be assumed that the other two members of this class of compounds mentioned in the prior art, namely ethylene glycol diethyl ether and ethylene glycol dibutyl ether, also would not meet the requirements stated here.

In addition to the ethylene glycol dialkyl ethers, diethylene glycol dialkyl ethers have also been proposed as cocatalysts in the past (see, for example, European Offenlegungsschrift No. 0,090,365).

However, the results are unsatisfactory in this case too. If diethylene glycol dimethyl ether is used in the polymerization of butadiene and styrene, a coupling yield of 0% is likewise obtained (cf. Example 8 of U.S. Pat. No. 4,530,985). Our own experiments with this glycol ether in the polymerization of isoprene gave a polymer yield of only 78%.

Our own experiments with diethylene glycol diethyl ether in the polymerization of isoprene gave an improved polymer yield; however, it was not possible to synthesize stellate rubbers. This indicates that, when the coupling agent was added, no living polymers at all were present. The inventors of U.S. Pat. No. 4,530,985 therefore correctly concluded that "many of the modifiers (meaning the cocatalysts) which have been generally proposed in the past, such as, for example, diethylene glycol dimethyl ether, tend to terminate the polymerization reaction prematurely and/or to interfere in the coupling reaction" (cf. column 1, lines 31 to 35). J. Kminek et al. also comes to the conclusion that the "living polymers" are stable for only a short time in the presence of ethylene glycol dimethyl ether (cf. Makromol. Chemie 183, 1755 (1982)).

U.S. Pat. No. 4,530,985 proposes the use of the compounds of the general formula $$R_1-O-CH_2-CH(R_2)-O-C(R_3R_4)-O-R_5$$

instead of the known glycol ethers.

However, the microstructure regulation and coupling yield of these cocatalysts are likewise not satisfactory.

Furthermore, these compounds are difficult to obtain.

In the stated prior art, there was no process for the preparation of polyisoprene in which the practical requirements stated here for the cocatalyst are met. The aim of the present invention was to provide such a process. A further aim of the present invention was to provide polyisoprenes which contain more than 70%, preferably more than 85%, of 1,2- and 3,4-structural units and can be used for the production of tires and damping elements.

Such a process has now surprisingly been found. In this process, the cocatalyst used is an ethylene glycol dialkyl ether of the formula $$R_1-O-CH_2-CH_2-O-R_2$$

in which $R_1$ and $R_2$ are alkyl groups having different numbers of C atoms. Preferably, the sum of the C atoms of the two groups $R_1$ and $R_2$ is 5 to 7, in particular 6.

An inert organic solvent is used as the reaction medium. Hydrocarbons having 6 to 12 C atoms, such as pentane, hexane, heptane, octane and decane, and their cyclic analogs, are particularly suitable. Aromatic solvents, such as, for example, benzene, toluene, xylenes etc., are also suitable. Mixtures of the compounds described above can of course also be used.

The catalysts used are alkyllithium compounds, which are readily accessible by reacting lithium with the corresponding alkyl halides. The alkyl groups have 1 to 10 C atoms. Individual hydrogen atoms can be substituted by phenyl radicals. The following alkyllithium compounds are particularly suitable: methyllithium, ethyllithium and pentyllithium; butyllithium is preferred. In principle it is also possible to use bifunctional organic lithium compounds. However, these are less readily accessible and are less advantageous than their monofunctional analogs particularly when it is desired to prepare stellate polyisoprene.

The amount of catalyst used depends on the molecular weight to be established. This is usually in the range from 50,000 to 1,500,000. The molecular weight [M], the amount of monomer in g [I] and the molar amount of the catalyst [K] have the following empirical relationship $$[I]/[K]=[M].$$

which is usually employed for determining the amount of catalyst required. For a desired molecular weight in the range from 50,000 to 400,000, 0.128 to 0.016 part of n-butyllithium is preferably used per 100 parts of isoprene. In order to obtain molecular weights of less than 50,000, larger amounts of a catalyst are required. From a few exploratory experiments, the skilled worker will be capable of specifying the amounts of catalyst. The cocatalyst is preferably added at the beginning of the reaction. However, it may also be added during the polymerization, if this is advantageous for any reason.

According to the invention, ethylene glycol ethers of the formula $$R_1-O-CH_2-CH_2-O-R_2$$

are used as cocatalysts. $R_1$ and $R_2$ are C(1-4)-alkyl groups such as methyl, ethyl, n- and isopropyl and n-, iso-, sec.- and tert.-butyl. The alkyl groups $R_1$ and $R_2$ must be different, this being the critical factor; the groups $R_1$ and $R_2$ must differ in the number of C atoms. Preferably, the sum of the C atoms of the two groups is 5 to 7, in particular 6. A particularly preferred ethylene glycol ether is the compound in which $R_1$=ethyl and $R_2$=tert.-butyl. The glycol ethers according to the invention are known. They are obtainable, for example, by the principle of the Williamson synthesis, from a sodium alcoholate and an alkyl halide. The ethers of the formula $$R_1-O-CH_2-CH_2-O-C(CH_3)_3$$

can be prepared in a simple manner by reacting the corresponding alcohol $$R_1-O-CH_2-CH_2-OH$$

with isobutene in the presence of an acidic ion exchanger.

The cocatalyst is used in a ratio of 2:1 to 30:1, in particular 2:1 to 15:1, based on the number of moles of the catalyst. At higher temperatures, larger amounts of cocatalyst are generally required in order to achieve the desired regulation of the microstructure.

In a particularly preferred variant of the process according to the invention, the polyisoprene units obtained after substantially complete conversion of the monomers are coupled with a coupling agent to give stellate polymers. In another possible method, the polyisoprene units obtained are reacted with reactive electrophiles, such as, for example, ketones, epoxides, esters and isocyanates. In both cases, a functionalized isoprene is obtained.

Coupling agents suitable for this purpose are, in particular, tetrahalides of the elements silicon, germanium, tin and lead, as well as aromatics which carry at least two vinyl groups, such as, for example, 1,3,5-trivinylbenzene and 1,3- and 1,4-divinylbenzene. The latter can, if required, also be added in several portions.

The polymerization is carried out in the temperature range from 0° to 100° C. It is preferably carried out at 40° to 70° C.

The coupling is carried out at 0° to 150° C., preferably 40° to 100° C.

The polyisoprenes obtained have a molecular weight of 40,000 to 1,500,000, preferably 200,000 to 1,000,000.

The process can be carried out both batchwise and continuously.

If they are to be processed to vulcanisates, the resulting amorphous polymers of isoprene are mixed with active reinforcing fillers, a vulcanizing agent and conventional additives. In general, this mixing procedure has to be carried out under the action of shear forces.

Compositions intended for the production of tire treads are generally molded to raw tread strips. During homogenization and shaping, which may be effected, for example, in an extruder, the conditions of temperature and time are chosen so that vulcanization does not occur.

The rubber component consists of, for example, 70 to 100% by weight of a rubber of the invention and 0 to 30% by weight of a rubber from the group consisting of the known, amorphous, highly unsaturated all-purpose rubbers, such as, for example, styrene/butadiene rubber, 1,4-cis-polybutadiene, 1,4-cis-polyisoprene and natural rubber.

Active reinforcing fillers are, for example, tire tread carbon blacks of various activities, especially those of the N-300 series (ASTM), highly disperse silicas treated with silane adhesion promoters, and mixtures thereof.

Conventional vulcanizing agents contain, for example, sulfur in combination with accelerators. The amount of the vulcanizing agent depends on the other components in the vulcanizable composition and can be determined by simple exploratory experiments.

The plasticizer oils customary in rubber technology, preferably aromatic, aliphatic and naphthenic hydrocarbons, and conventional assistants, such as, for example, zinc oxide, stearic acid, rosin acids, antiaging agents and ozone protecting waxes, can be introduced as additives, in conventional amounts.

The isoprene polymers according to the invention are suitable in particular for the production of treads for car and truck tires, namely for the production of new tires as well as for retreading old tires.

The tire treads obtained are distinguished by excellent adhesion. The extraordinarily high reversion stability during the vulcanization process and the extraordinarily high network stability of the tire treads under dynamic stress should also be emphasized. The isoprene polymers are therefore particularly suitable for the production of treads for truck tires (cf. European Offenlegungsschrift No. 0,168,524).

The isoprene-based polymers according to the invention can also be used for the production of damping elements (see, for example, German Offenlegungsschrift No. 2,459,357).

Experimental section

The solvent used was a hydrocarbon mixture consisting of about 50% of hexane. Other components of this hydrogenated $C_6$ cut were, in particular, pentane, heptane and octane and their isomers. The solvent was dried over a molecular sieve having a pore diameter of 0.4 nm, so that the water content was reduced to below 10 ppm, and was then stripped with $N_2$.

The organic lithium compound was n-butyllithium, which was used in the form of a 20% strength solution in hexane.

Before being used, isoprene was refluxed for 24 hours over calcium hydride, distilled off, and titrated with n-butyllithium in the presence of o-phenanthroline.

The glycol ethers were distilled over calcium hydride and then titrated with n-butyllithium in the presence of o-phenanthroline.

The divinylbenzene was used in the form of an isomer mixture of m- and p-divinylbenzene, after drying over alumina.

1.5 l of $C_6$-hydrocarbon mixture, 200 g of isoprene and the particular cocatalyst were initially introduced at 50° C. into a V2A stirred autoclave flushed with dry nitrogen. The amount of cocatalyst can be calculated from the weight ratios of catalyst to cocatalyst stated in each case. The polymerization was initiated by adding 2.5 mmol of n-butyllithium solution, and isothermal conditions were maintained After 2 hours, 1.6 g of divinylbenzene were added.

The polymer obtained was stabilized with 0.5 part of 2,2'-methylene bis-(4-methyl-6-tert.-butylphenol), based on 100 parts of isoprene, precipitated with 2,500 ml of a mixture of isopropanol and methanol in a volume ratio of 80:20, and dried at 50° C.

The coupling yield is regarded as the percentage of rubber which, after reaction with a coupling agent, has a stellate structure and is distinguished from the uncoupled rubber by a substantially higher molecular weight. The determination is carried out by GPC analysis, tetrahydrofuran being used as the solvent and polystyrene as column material. The polymers are characterized using a light scattering detector. For this purpose, samples are taken from the reactor before the addition of the coupling agent and at the end of the reaction.

The microstructure is determined from the IR spectrum.

The Examples 1 to 8 which follow are according to the invention, while the Examples A to F below are comparative experiments.

TABLE

| Experiment | $R_1$ | $R_2$ | Cocatalyst/catalyst ratio | Polymer yield after 2.5 hours % | Content of 1,2-SU in % | Content of 3,4-SU[1] in % | Coupling yield | Polymer yield after 20 min | Separability from hexane |
|---|---|---|---|---|---|---|---|---|---|
| 1 | $CH_3$ | $C(CH_3)_3$ | 5 | 95 | 9 | 80 | 65 | 65 | good |
| 2 | $CH_3$ | $C(CH_3)_3$ | 10 | 95 | 11 | 86 | 60 | | good |
| 3 | Et | $C(CH_3)_3$ | 5 | 95 | 8 | 81 | 60 | | good |
| 4 | Et | $C(CH_3)_3$ | 10 | 96 | 9 | 85 | 70 | | good |
| 5 | Prop | $C(CH_3)_3$ | 5 | 94 | 7 | 75 | 80 | | good |
| 6 | Prop | $C(CH_3)_3$ | 10 | 93 | 8 | 84 | 70 | | good |
| 7 | Et | But | 5 | 95 | 9 | 82 | 65 | 70 | good |
| 8 | Et | But | 10 | 94 | 10 | 84 | 60 | | good |
| A | Me | Me | 5,5 | 90 | 5 | 73 | 0 | | poor |
| B | Et | Et | 5 | 95 | 8 | 83 | 70 | 50 | satisfactory |
| C | t-But | t-But | 5 | 95 | 5 | 60 | 80 | | good |
| D | Me | O—$CH_2$—$CH_2$—O—Me | 3,6 | 78 | 8 | 81 | 0 | | good |
| E | Et | O—$CH_2$—$CH_2$—O—Et | 3,8 | 89 | 8 | 78 | 0 | | good |
| F | But | O—$CH_2$—$CH_2$—O—But | 6,8 | 90 | 6 | 71 | 0 | | good |

[1] SU = structural units

The table shows the following:
1. The dialkyl ethers of diethylene glycol (see comparative Examples D, E and F) have the effect that the polyisoprene units formed can no longer be coupled. The same applies to ethylene glycol dimethyl ether (see comparative Experiment A). This compound cannot be separated off from n-hexane by distillation.

2. Although ethylene glycol diethyl ether permits coupling of the polyisoprene units, it can be separated from the solvent only with comparatively great effort and apparently also has an adverse effect on the polymerization, which is evident from the substantially lower polymer yield after 20 minutes.

3. The dibutyl ethers of ethylene glycol and of diethylene glycol exhibit unsatisfactory regulation of the microstructure.

We claim:

1. A process for the preparation of polyisoprene which may possess functional groups and contains more than 70% of 1,2- and 3,4-structural units by anionic polymerization of isoprene in an inert hydrocarbon solvent in the presence of an organolithium compound as the catalyst and an ether as the cocatalyst, wherein the cocatalyst used is an ethylene glycol dialkyl ether of the formula $$R_1-O-CH_2-CH_2-O-R_2$$

in which $R_1$ and $R_2$ are alkyl groups having different numbers of C atoms, from the group consisting of methyl, ethyl, n- and isopropyl and n-, iso-, sec.- and tert. -butyl, and wherein the sum of the C atoms in the two alkyl groups $R_1$ and $R_2$ is 5 to 7.

2. A process as claimed in claim 1, wherein the sum of the C atoms in the two alkyl groups $R_1$ and $R_2$ is 6.

3. A process for the preparation of polyisoprene having a stellate microstructure as claimed in claim 1, wherein a coupling agent is added to the polymerization batch at the end of the reaction.

4. A process as claimed in claim 3, wherein the coupling agent used is a di- or trivinylbenzene.

5. A process according to claim 1, wherein one of $R_1$ and $R_2$ is methyl.

6. A process according to claim 1, wherein the polyisoprene contains more than 85% of 1,2 and 3,4-structural units.

7. A process according to claim 1, wherein the inert organic solvent comprises a hydrocarbon having 5 to 12 carbon atoms.

8. A process according to claim 7, wherein the solvent is: (a) pentane, hexane, heptane, octane, decane, cyclic analogs thereof, or mixtures thereof; (b) benzene, toluene, xylene or mixtures thereof; or (c) mixtures of (a) and (b).

9. A process according to claim 1, wherein $R_1$ is ethyl and $R_2$ is tert-butyl.

10. A process according to claim 1, wherein the cocatalyst is present in a ratio of 2:1 to 30:1, based on the number of moles of catalyst.

11. A process according to claim 10, wherein the cocatalyst is present in a ratio of 2:1 to 15:1 based on the number of moles of catalyst.

* * * * *

UNITED STATES PATENT AND TRADEMARK OFFICE
CERTIFICATE OF CORRECTION

PATENT NO. : 4,894,425

DATED : January 16, 1990

INVENTOR(S) : WALTER HELLERMANN ET AL

It is certified that error appears in the above-identified patent and that said Letters Patent is hereby corrected as shown below:

Title page, Inventors, fourth inventor:

should read -- Paul Sunder-Plassmann, Marl, Fed. Rep. of Germany

Signed and Sealed this

Eleventh Day of December, 1990

Attest:

HARRY F. MANBECK, JR.

*Attesting Officer*   *Commissioner of Patents and Trademarks*